(12) United States Patent
Manfredotti

(10) Patent No.: US 6,247,684 B1
(45) Date of Patent: Jun. 19, 2001

(54) ANTIVIBRATION DEVICE INTENDED TO REDUCE THE TRANSMISSION OF VIBRATION BETWEEN TWO BODIES, AND APPLICATIONS

(75) Inventor: Thomas Pierre Louis Manfredotti, Aix-en-Provence (FR)

(73) Assignee: Eurocopter, Marigagne Cedex (FR)

( * ) Notice: Subject to any disclaimer, the term of this patent is extended or adjusted under 35 U.S.C. 154(b) by 0 days.

(21) Appl. No.: 09/458,668

(22) Filed: Dec. 10, 1999

(30) Foreign Application Priority Data

Dec. 22, 1998 (FR) .................................... 98 15662

(51) Int. Cl.⁷ ................. F16F 7/10; B64C 27/06
(52) U.S. Cl. ........................ 267/136; 244/17.27
(58) Field of Search ..................... 188/379, 380; 244/17.27; 248/557, 559

(56) References Cited

U.S. PATENT DOCUMENTS

| 2,426,130 | 8/1947 | Wald ..................... 416/145 |
| 2,457,425 | 12/1948 | Wolfard ................. 248/584 |
| 4,365,771 | 12/1982 | Halwes ................. 244/17.27 |
| 4,403,681 | * 9/1983 | Desjardins ............ 188/379 |
| 4,458,862 | * 7/1984 | Mouille ............... 244/17.27 |
| 4,550,812 | * 11/1985 | Mard ................... 188/379 |
| 4,619,349 | * 10/1986 | Braun ................. 188/380 |
| 4,781,363 | 11/1988 | Braun ................. 267/225 |
| 5,481,142 | 1/1996 | James et al. ............ 310/51 |
| 6,009,986 | * 1/2000 | Bansemir et al. ........ 188/380 |

FOREIGN PATENT DOCUMENTS

| 2339107 | 8/1977 | (FR) . |
| 2499505 | 8/1982 | (FR) . |
| 2669982 | 6/1992 | (FR) . |
| 2162612 | 2/1986 | (GB) . |

* cited by examiner

Primary Examiner—Christopher P. Schwartz
(74) Attorney, Agent, or Firm—Stevens, Davis, Miller & Mosher, L.L.P.

(57) ABSTRACT

The present invention relates to an antivibration device intended to reduce the transmission of vibration between two bodies (2, 3).

According to the invention, the antivibration device comprises an elastic annular element (4) which is connected to two bodies (2, 3) so as to serve as a connection between them and which is capable of being deformed under the action of vibration generated in at least one of the bodies, and a resonator (5) connected, via at least two leaves (6, 7) which are flexible in terms of bending and rigid in terms of tension and in terms of compression, to the internal face (8) of the annular element (4) so as to be set in oscillating rotation when the annular element (4) is deformed, by the action of vibration so that, by this oscillating rotation, the resonator (5) generates an antivibration inertia force which opposes the vibration and thus reduces its transmission from one body to the other.

12 Claims, 4 Drawing Sheets

ANTIVIBRATION DEVICE INTENDED TO REDUCE THE TRANSMISSION OF VIBRATION BETWEEN TWO BODIES, AND APPLICATIONS

BACKGROUND OF THE INVENTION

1. Field of the Invention

The present invention relates to an antivibration device intended to reduce the transmission of vibration between two bodies, and to applications of said antivibration device.

Although said antivibration device can be used in all situations in which transmission of vibration between two bodies needs to be reduced, it is more specifically applicable to improving a device for the suspension of a transmission gearbox of a rotary-wing aircraft and, in particular, of the main transmission gearbox of a helicopter.

2. Description of the Related Art

It is known that a helicopter main transmission gearbox of this type, mounted between propulsion means and a lift rotor of said helicopter so that it is roughly longitudinal with respect to the axis of said rotor and which is suspended from the fuselage of said helicopter, is subjected to significant vibration generated by said lift rotor. This vibration is particularly troublesome because, in the absence of any system to filter the vibration, such as a transmission gearbox suspension device for example, it is transmitted to the structure of the fuselage of the helicopter and in particular is likely to limit the maximum speed of the helicopter, structurally weaken it and have an adverse effect on the comfort of the occupants of the helicopter. It is therefore necessary for said suspension device to be as effective as possible in opposing the transmission of such vibration and the associated forces from the main transmission gearbox toward the fuselage of the helicopter so as to avoid premature wear of the elements subjected to this vibration and make the pilot cockpit and passenger cabin as comfortable as possible.

Patents FR-2 499 505 and FR-2 669 982 in the name of the Applicant Company, disclose helicopter main transmission gearbox suspension devices which allow a particularly efficient reduction in the vibration generated by the lift rotor.

To this end, the suspension devices described in these prior-art documents are of the type comprising:

support or attachment pieces or bars, distributed radially around said transmission gearbox, the upper ends of which pieces or bars are connected to the upper part of the transmission gearbox and the lower ends of which pieces or bars are articulated on suspension leaves or on the fuselage;

possibly a suspension system connecting the lower part of the transmission gearbox to the aircraft fuselage and comprising, in particular, said suspension leaves which are distributed radially around said transmission gearbox in a plane which is roughly orthogonal to the axis of the rotor, the radially inner ends of which are fixed to the lower part of said transmission gearbox and the radially outer ends of which are articulated on the fuselage; and resonator means associated respectively with said support pieces, either at their lower ends (FR-2 499 505), or at their upper ends (FR-2 669 982). Each of said resonator means comprises a mass support which is secured by one of its ends either to the suspension leaf connected to the associated support piece or directly to this support piece, and which is equipped at its other end with a beating mass. Said resonator means are essentially intended to reduce the vibration of the rotor transmitted by said support pieces.

Although particularly effective, said known uspension device does have certain drawbacks, particularly:

its accessibility is limited and its size is large, particularly as a -result of the presence of the aforementioned resonator means; and its cost is high, particularly because of the existence of elastomer articulations, particularly to allow an effective arrangement and effective operation of the suspension leaves and of the mass supports.

Document U.S. Pat. No. 4,781,363 discloses an antivibration device which can be mounted between the main transmission gearbox and the fuselage of a helicopter, to reduce the transmission of vibration between the two.

To this end, this known antivibration device comprises:

a first cylindrical chamber and a second cylindrical chamber which communicate, which are filled with a fluid and which are deformable in the direction of the vibrational movement. The second chamber has a cross section of smaller area than the first chamber so that this second chamber is deformed to a greater extent than the first and its fluid is accelerated when there is deformation; and an inertial mass which is connected to a piston arranged in said second chamber and which is moved when the vibration is generated, the movement of this inertial mass leading to a change in the pressure of the fluid in said second chamber so as to generate an effect which opposes the vibration.

In addition, when the rigidity of the deformable chambers is not great enough to withstand the effects of the vibration, said known device may additionally comprise a resistant elastic element of circular shape, made of a glass-fiber reinforced plastic.

This known device thus allows certain drawbacks of the aforementioned suspension device to be overcome, and in particular makes it possible to reduce the size.

However, this known antivibration device also has a great many drawbacks, and in particular:

its operation is limited by the freezing point of the fluid used;

there are risks of leakage of said fluid, liable in particular to reduce the effectiveness of said device;

it is difficult to completely fill the device with fluid, because of the risk of the appearance of air pockets, without providing complex and expensive bleed means; and particularly because of the high number of parts of which it is made, it is particularly complicated and difficult to produce.

SUMMARY OF THE INVENTION

The object of the present invention is to overcome these drawbacks. The invention relates to an antivibration device of low cost and size, which is particularly simple and reliable and allows the transmission of vibration between two bodies, and particularly between two sections of a bar, for example a bar connecting two vibrating elements to be reduced effectively, said antivibration device being able in particular to be used to improve a rotary-wing aircraft transmission gearbox suspension device.

To this end, according to the invention, said device is noteworthy in that it comprises:

an elastic annular element which is connected to said two bodies so as to serve as a connection between them and which is capable of being deformed under the action of vibration generated in at least one of said bodies; and a resonator means connected, via at least two leaves which are flexible in terms of bending and rigid in terms of tension and in terms of compression, to the internal face of said annular element so as to be set in oscillating rotation when said annular element is deformed, by the action of said vibration so that, by this oscillating rotation, said resonator means generates an antivibration inertia force which opposes said vibration and thus reduces its transmission from one body to the other.

Thus, when vibration is generated, the annular element deforms and makes the resonator means rotate, he angular deformation of the latter being compensated or by the deformation in bending of the leaves. Through this rotation, said resonator means generates an antivibration inertia force which is transmitted to the annular element and to the vibrating body, by means of the compression or tension of the leaves, which makes it possible effectively to reduce the transmission of vibration from one vibrating body to another body.

Furthermore, as will be seen in greater detail hereinbelow from a number of different embodiments, said antivibration device is simple, small in size, inexpensive and highly reliable.

Furthermore, even in the improbable scenarios:

of breakage of one or more leaves, the only consequence is a drop in the reduction of vibration and therefore an increase in its transmission from one body to the other; and of breakage of the annular element, the resonator means comes into abutment between said bodies, and this maintains a connection between the latter and does not influence the operation of the system comprising them.

Incidentally, it will be noted that the annular element in accordance with the invention has different properties and a different function than those of the aforementioned resistant elastic element disclosed by document U.S. Pat. No. 4,781,363. Specifically, said annular element is an element which is essential in the implementation of the present invention and has the particular purpose of facilitating the transmission of vibration to the resonator means, whereas said resistant elastic element is intended to limit the transmission of vibration to the chambers so as to protect them from vibration of excessive amplitude. Furthermore, this resistant elastic element is merely an auxiliary protection element, rather than an element which is essential to the operation of said known antivibration device.

Advantageously, said resonator means comprises a support which is arranged inside said annular element and which is secured, on the one hand, to said leaves and, on the other hand, to at least one support piece bearing at least one mass. As a preference, said mass comprises a number of metal washers borne by said support piece, which makes it possible easily to modify this mass and thus easily to adjust the frequency of the resonator means to the frequency of the vibration that is to be reduced. Of course, the washers may be replaced by other parts.

Said resonator means may comprise a varying number of masses, arranged in various ways. However, in particularly advantageous embodiments, said resonator means comprises:

two masses arranged symmetrically with respect to the center of said annular element, which makes it possible to simplify production; or two masses arranged on one same side of a plane of symmetry of said annular element passing roughly through the center of the zones where the latter is attached to said bodies, which makes it possible to free up the opposite side and thus reduce the size on this opposite side; or four masses arranged symmetrically in pairs:
on the one hand, with respect to said center of said annular element; and
on the other hand, with respect to said plane of symmetry of said annular element.

Furthermore, for reasons of stability and effectiveness of the antivibration device, the latter additionally comprises means for preventing said resonator means from moving in a direction that is lateral to said leaves. As a preference, said means, for example retaining plates or pieces made of molded elastomer are attached to said support and bear against the internal face of said annular element.

Furthermore, in a preferred embodiment, said annular element, said leaves and said support are made as a single piece, which is, for example, machined by numerical control from a plate or forged blank, which simplifies production and assembly and allows the cost to be reduced.

For the same purpose, the antivibration device according to the invention may advantageously be produced so that it is symmetric with respect to a point.

Of course, in the context of the present invention, said antivibration device may be mounted between any two bodies, at least one of which vibrates, so as to reduce the transmission of vibration to the other body.

However, in a preferred embodiment, said two bodies correspond to two sections of a bar, so that the device according to the invention is incorporated into said bar, for example a support bar for the main transmission gearbox of a helicopter, of the aforementioned type. According to the invention, to simplify production and assembly of said antivibration device and thus reduce its cost, each of said two sections advantageously comprises a half ring at one of its ends, the two half rings being able to be connected together to form said annular element.

The present invention also relates to a device for the suspension of a transmission gearbox of a rotary-wing aircraft, said transmission gearbox being mounted between propulsion means and a lift rotor of said aircraft roughly longitudinally with respect to the axis of said rotor and being suspended from the fuselage of said aircraft, said suspension device comprising support bars distributed radially around said transmission gearbox, the upper ends of which bars are connected to the upper part of the transmission gearbox, and the lower ends of which bars are connected to said fuselage.

According to the invention, said suspension device is noteworthy:

in a first embodiment, in that at least some of said support bars are formed of two sections and in that said suspension device comprises, for each of the support bars thus formed, an antivibration device according to the invention, which is arranged between said sections of the support bar; and in a second embodiment, in that it additionally comprises, for each of at least some of said support bars, an antivibration device according to the invention, which is arranged at one end of the corresponding bar and which is intended to reduce the transmission of vibration between this bar and the element (the transmission gearbox or the fuselage for example) to which this end of the bar is connected.

This suspension device according to the invention thus makes it possible to overcome the drawbacks of the known suspension devices described, in particular, in the aforementioned patents FR-2 499 505 and FR-2 669 982, because:

owing to the integration of the antivibration device into the support bars or pieces and therefore to the absence of mass supports and beating masses between the transmission gearbox and the support pieces, the size of said suspension device is reduced and its accessibility is improved; and the cost is reduced, particularly as a result of the absence of expensive elastomer articulations which exist, in particular, in the mounting of the suspension leaves and mass supports of these known suspension devices.

BRIEF DESCRIPTION OF THE DRAWINGS

The figures of the appended drawing will make it easy to understand how the invention may be achieved. In these figures, identical references denote similar elements.

DETAILED DESCRIPTION OF THE PREFERRED EMBODIMENTS

Figure 1:
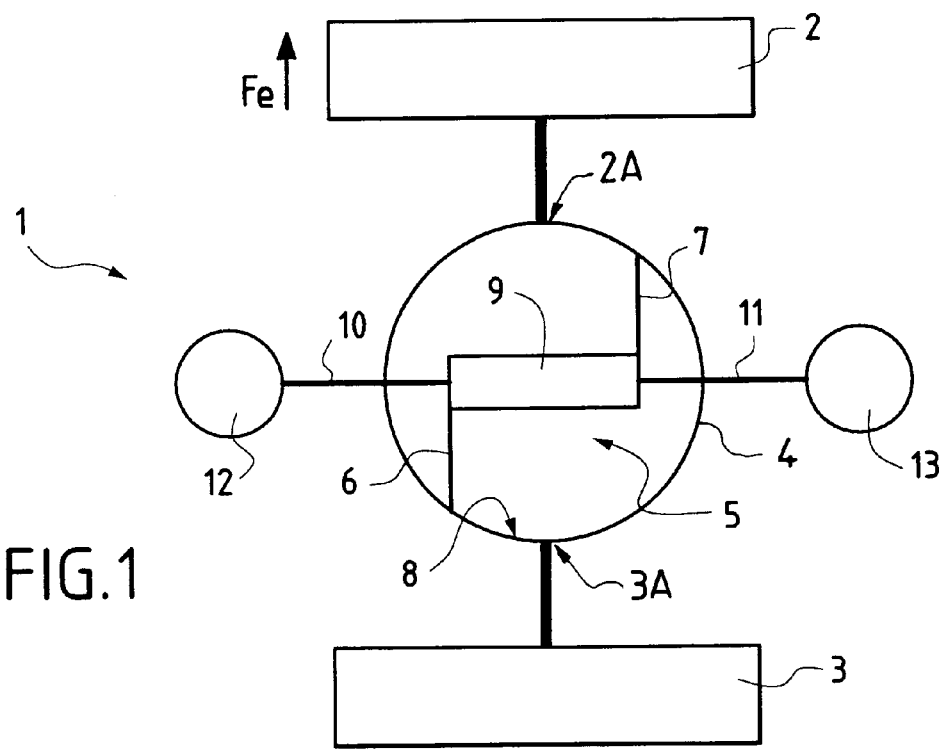
FIGS. 1 to 3 diagrammatically illustrate the principle of operation of an antivibration device according to the invention.

The device 1 according to the invention and depicted diagrammatically in FIG. 1 is intended to reduce the transmission of vibration between two bodies 2 and 3, for example a vibrating element such as an engine and a support for this vibrating element.

To this end, according to the invention, said device 1 comprises:

an elastic annular element 4 which is fixed to said two bodies 2 and 3 at points or zones 2A and 2B so as to serve as a connection between them and which is capable of being deformed under the action of vibration illustrated by an arrow Fe and generated, for example, in the body 2; and a resonator means 5 connected, via two leaves 6 and 7 which are flexible in terms of bending and rigid in terms of tension and in terms of compression, to the internal face 8 of said annular element 4, so as to be made to rotate/oscillate when said annular element 4 is deformed, by the action of said vibration Fe so that, by this rotation/oscillation, said resonator means 5 generates an antivibration inertia force which, combined with the forces of the elastic annular element 4, opposes said vibration Fe and thus reduces its transmission, for example from the body 2 to the body 3.

According to the invention, said resonator means 5 comprises a support 9 which is arranged inside said annular element 4 and which is secured, on the one hand, to said leaves 6 and 7 and, on the other hand, to at least one support piece 10 or 11 bearing at least one mass 12 or 13.

Figure 2:
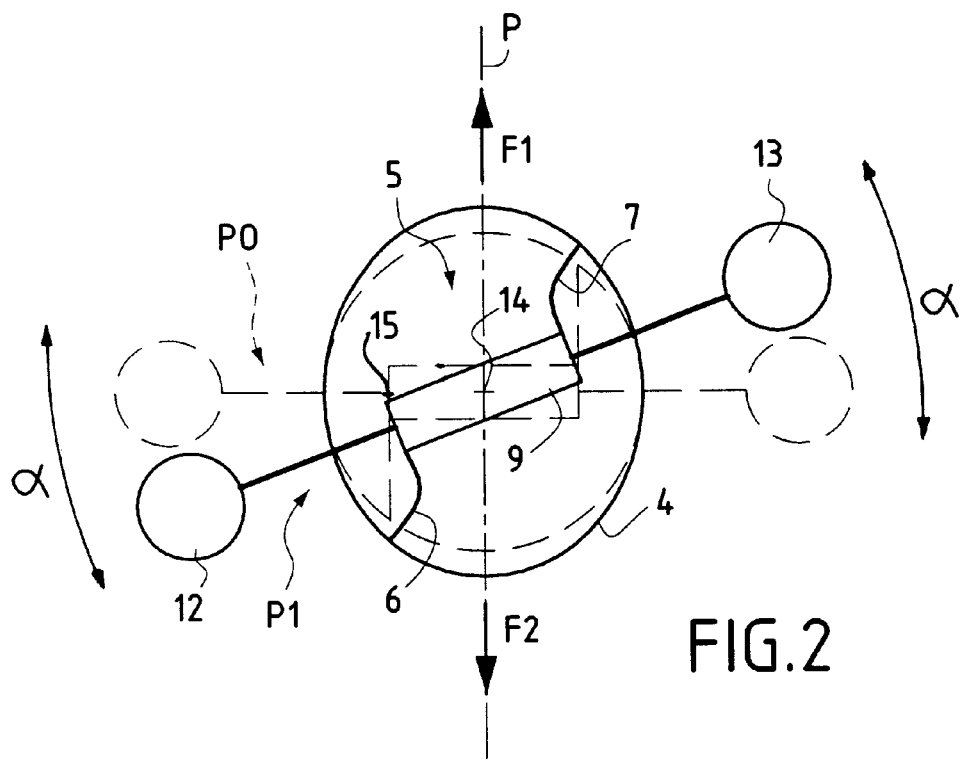

In the embodiment depicted in FIGS. 1 and 2, said resonator means 5 comprises two masses 12 and 13 arranged symmetrically:

on the one hand, with respect to the center 14 of the annular element 4 in its undeformed position; and on the other hand, with respect to a plane of symmetry P of said annular element 4 passing roughly through the center of the zones 2A and 3A where said annular element 4 is attached to the bodies 2 and 3.

This undeformed position PO is depicted in broken lines in FIG. 2.

In consequence, when at least one of the bodies 2 or 3 vibrates, the annular element 4 deforms. The deformed position P1 is depicted in solid line in FIG. 2 and is obtained, in the example depicted, both by a deformation force F1 and by a deformation force F2, of opposite sense. This deformation makes the resonator means 5 rotate/oscillate as illustrated by the double-headed arrows α. The angular deformation of said resonator means 5 is compensated for by the deformation in bending of the leaves 6 and 7, as depicted.

Through this rotation/oscillation, the resonator means 5 generates an antivibration inertia force which is transmitted to the annular element 4 and to the vibrating bodies 2 and/or 3, by means of the compression or tension in the leaves 6 and 7, which makes it possible effectively to reduce the transmission of vibration from one body to the other.

It will be noted that it is advantageous to have elements which are symmetric or asymmetric, for reasons of space available to house the resonator means 5, and for reasons of simplifying the manufacture of the various pieces of the device 1.

However, even in the case of symmetry, as in the embodiment of FIG. 2, the masses 12 and 13 may have different weights, and particularly for the same volume (using materials with different specific mass).

Of course, in the event of full symmetry (dimensions, masses, etc.) as is the case in the embodiment of FIG. 2, rotation is about the center 14, when the deformation forces F1 and F2 are of equal amplitude.

It will be noted that if the deformation force F2 is, for example, zero (particularly when the point 3A is fixed), the other conditions remaining identical, the resonator means 4 rotates roughly about a point 15.

In addition, if the device 1 is not symmetric, rotation may occur about a point located between said points 14 and 15.

Figure 3:
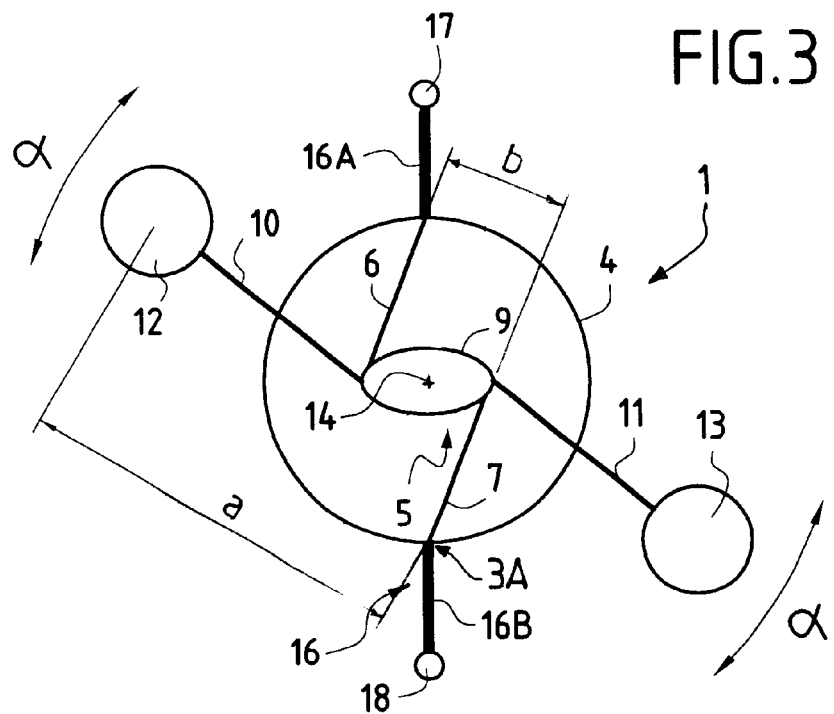

In the embodiment depicted diagrammatically in FIG. 3, the bodies 2 and 3 are replaced by two sections 16A and 16B of a bar 16, for example an attachment or connecting bar which may be articulated to two structures via ball joints 17 and 18 one provided at the free end of each of said sections 16A and 16B.

In this embodiment, the device 1 is therefore integrated into said bar 16. Furthermore, the masses 12 and 13 are also symmetric with respect to the center 14 of the annular element 4, but not with respect to the plane P defined earlier with reference to FIG. 2.

Figure 4:
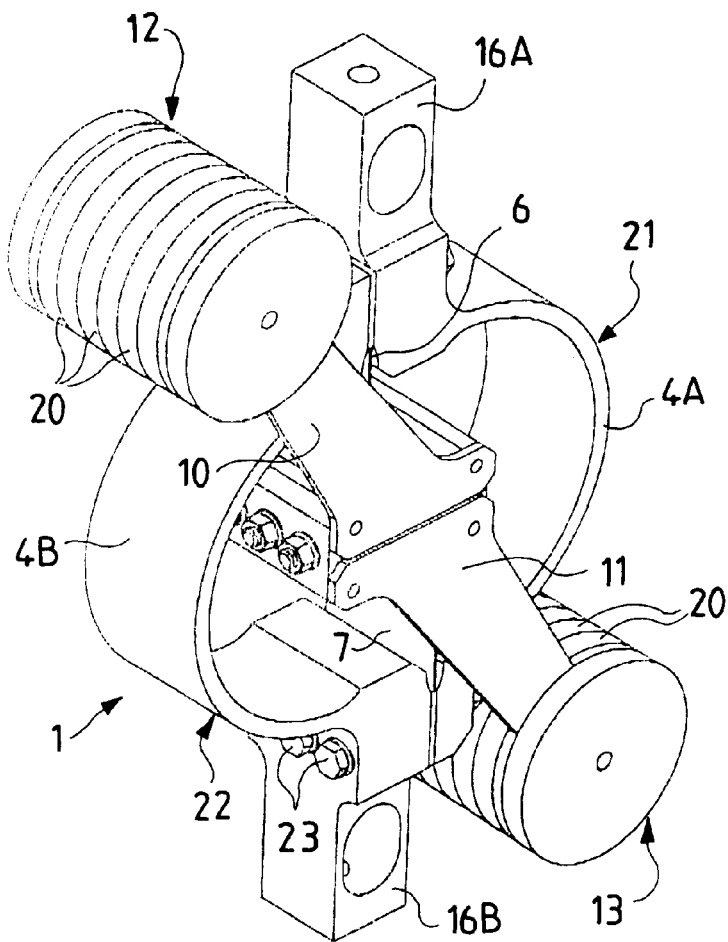
FIGS. 4 and 5 show, in perspective, a first and a second embodiment of an antivibration device according to the invention.
Figure 5:
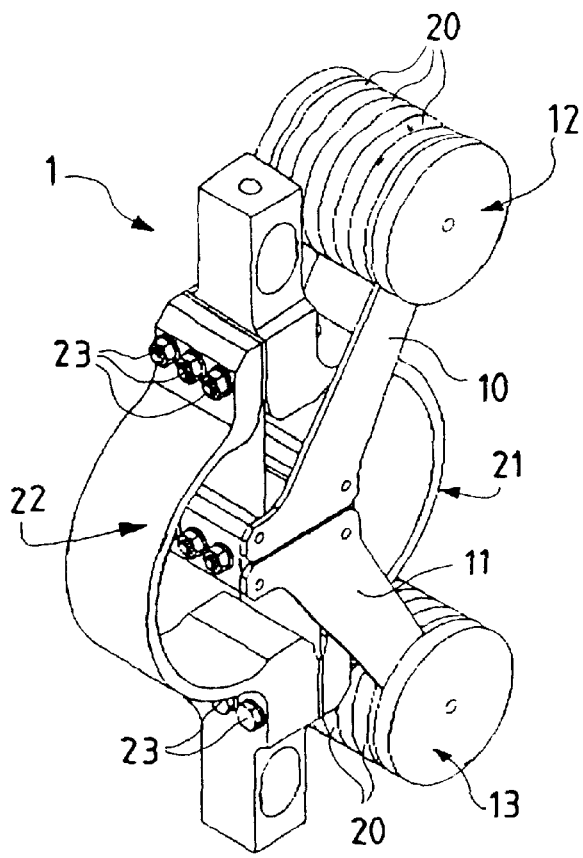
Figure 6:
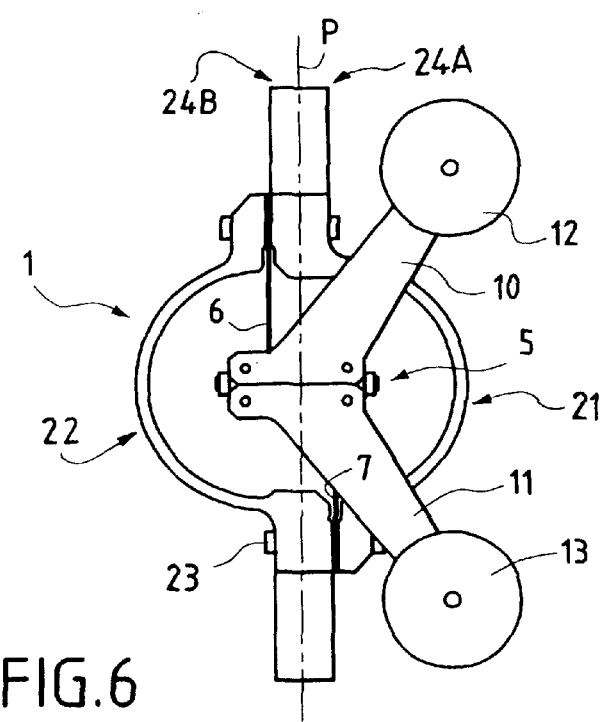
FIG. 6 is a front view of the embodiment of FIG. 5.

According to the invention, the elastic annular element 4:

may have any shape and position. However, use is preferably made of a symmetric shape, particularly a circular shape, as depicted in FIGS. 1 to 3 and 7 to 10 or an oblong shape, as depicted in FIGS. 4 to 6; and has a stiffness K which, for a symmetric embodiment, satisfies the following relationship:

$$K=2M\lambda(\lambda-1)\omega^2$$

in which:

$\lambda$ is an amplification ratio $\lambda=a/b$ where a is the distance between the point 3A assumed to be fixed and the center of the mass 12, and b is the distance between the ends of the support 9;

M is the mass of the beating masses 12 and 13; and

ω is the angular frequency of the vibration to be reduced.

In a particular embodiment, all the elements of the device 1 are made of metal which:

allows said device 1 to effectively withstand any fire that may break out;

leads to very light damping of the device 1 and therefore increases its effectiveness; and leads to a very long life for these elements.

It is also possible, for example, to use one of the following as material:

a stainless steel for the annular element 4 and the bar 16;

an inexpensive steel for the masses 12 and 13, because these are not loaded or critical parts; and carbon for the leaves 6 and 7, which allows their cost to be reduced.

In addition, said leaves 6 and 7 are preferably mounted prestressed so that their static stress is zero in operation, which improves their reliability.

Furthermore, in a preferred embodiment, said device 1 has a symmetric shape, as depicted in FIG. 3, with respect to the point 14. This makes it possible to reduce the number of parts or elements used, as will be seen in detail hereinbelow, and therefore the overall cost of said device 1.

Thus, by virtue of the invention, the device 1 exhibits, in addition to the aforementioned advantages, the following advantages:

a low cost of manufacture and use;

simplified assembly and disassembly;

limited size;

low overall mass; and good tolerance to damage, because breakage of the leaves 6 and 7 leads only to an increase in the level of vibration and breakage of the annular element 4 leads to the bodies 2 and 3 or 16A and 16B coming into abutment, and this in spite of everything allows these bodies to remain connected.

FIG. 4 shows a particular embodiment formed according to the principle of the device depicted diagrammatically in FIG. 3. This particular embodiment has several advantageous features and, in particular:

the masses 12 and 13 each comprise a number of metal washers 20 assembled together, which makes it possible easily to adjust the mass of said beating masses 12 and 13 and therefore makes it possible easily to adapt the frequency of the resonator means 5 to the frequency of the vibration to be reduced; and the bar 16 and the annular element 4 are formed of two pieces 21 and 22 fixed together, for example using bolts 23 and screws, the piece 21 comprising the section 16A and a half ring 4A and the piece 22 comprising the section 16B and a half ring 4B, said half rings 4A and 4B constituting the annular element 4 when assembled, which makes the device 1 easier to produce and to assemble and therefore reduces its cost.

The leaves 6 and 7 are clamped between the pieces 21 and 22 when the latter are assembled.

In the embodiment depicted in perspective in FIG. 5 and in a diagrammatic front view in FIG. 6, the same features as were indicated previously with reference to FIG. 4 can be seen.

The only difference is that the masses 12 and 13 are provided on one same side 24A of the plane P, which makes it possible to free up space on the opposite side 24B and thus facilitate, for example, access to the device 1 or to a system fitted with said device 1.

It will be noted that the masses 12 and 13 may be of any shape, particularly parallelepipedal or cylindrical.

Figure 7:
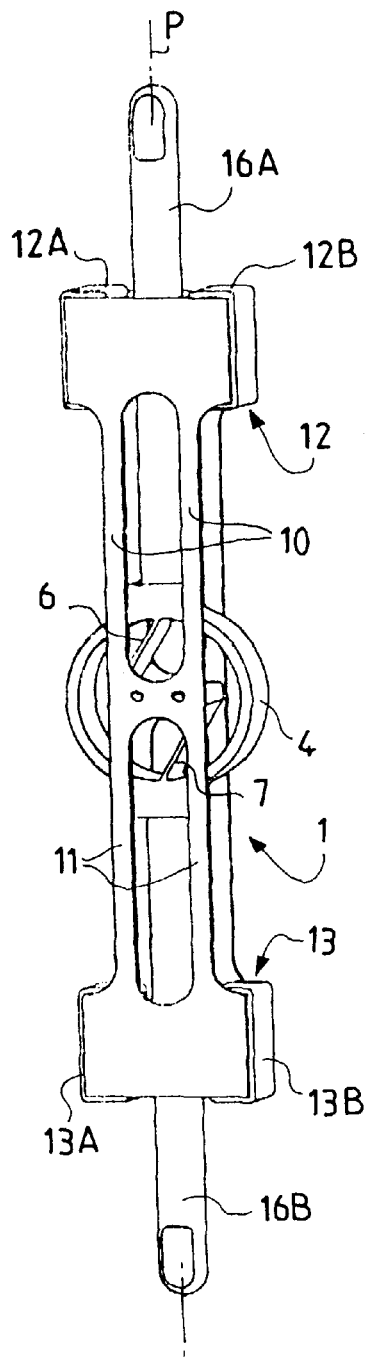
FIG. 7 shows a third embodiment of an antivibration device according to the invention.

Another embodiment is depicted in FIG. 7. In this case, the masses 12 and 13 are formed respectively of two partial masses 12A and 12B and 13A and 13B and said partial masses are arranged symmetrically:

in pairs 12A and 13B, 12B and 13A, with respect to the center, not depicted in FIG. 7, of said annular element 4; and in pairs 12A and 12B, 13A and 13B, with respect to the plane of symmetry P.

In addition, the support pieces 10 and 11 are arranged respectively along the sections 16A and 16B of the bar 16, and this makes it possible to greatly reduce the size of the device 1 on both sides of said plane P simultaneously.

Incidentally, it is known that the lateral movements of the leaves 6 and 7 combined with the oscillating movements of the masses 12 and 13 increases, as regards the antivibration force produced, the components relating to the second harmonic of the external influence. Of course, for light influences, these lateral movements remain very small. However, as soon as the level of influence increases, said lateral movements are amplified until they become almost completely unstable.

Figure 8:
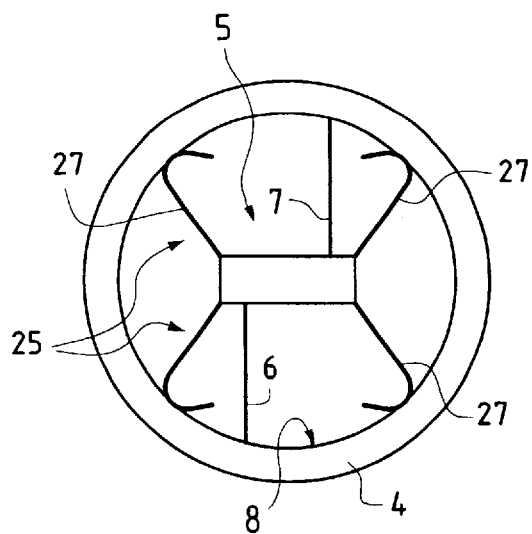
FIGS. 8 and 9 diagrammatically illustrate two different embodiments of means for preventing lateral movement of suspension leaves of a resonator means according to the invention.
Figure 9:
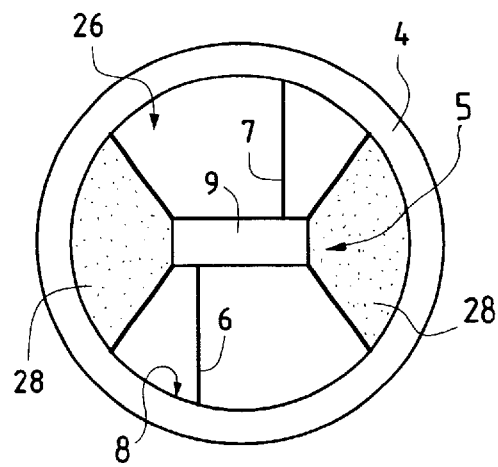

To overcome this drawback, the device 1 additionally comprises means 25 and 26 depicted in FIGS. 8 and 9 respectively, intended to prevent the resonator means 5 from moving in a direction that is lateral to said leaves 6 and 7.

To this end, said means 25 and 26, which are simple to produce, are fixed to said support and bear against the internal face 8 of said annular element 4.

To use them, said means 25 and 26 comprise, respectively:

as depicted in FIG. 8, at least two, but preferably four (or more) retaining plates 27 resting on lightly stressed zones of the annular element 4; and as depicted in FIG. 9, at least two molded elastomer pieces, preferably made of polyurethane.

As regards the latter embodiment, it will be noted that the elastomer pieces fulfil merely a retaining function, requiring no particular mechanical strength. These pieces therefore have a cost and strength requirements which have nothing in common with the elastomer articulations which exist, as mentioned earlier, in certain known suspension devices.

The device 1 according to the invention as described earlier may be applied to any type of system for which the transmission of vibration between two bodies needs to be reduced. To this end, it may:

either be arranged directly between the two bodies 2 and 3, as illustrated in FIG. 1;

or be incorporated into a connecting or attaching bar 16, as depicted in FIG. 3, which bar 16 may join together two elements, at least one of which vibrates.

Figure 10:
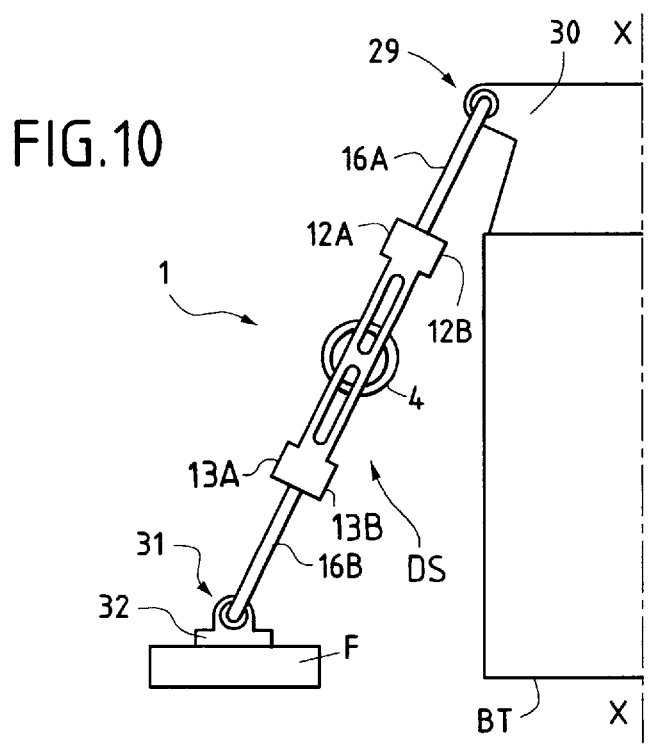
FIG. 10 diagrammatically depicts the integration of the device shown in FIG. 7 into a rotary-wing aircraft transmission gearbox suspension device.

However, in a preferred embodiment, said device 1 is used to improve a suspension device DS for the transmission gearbox BT of a rotary-wing aircraft, as depicted partially and diagrammatically in FIG. 10.

In the known way, such a transmission gearbox BT, for example the main transmission gearbox of a helicopter, is mounted between propulsion means and a lift rotor, not depicted, of said aircraft, so that it is roughly longitudinal with respect to the axis X—X of said rotor and is suspended from the fuselage F of said aircraft.

To achieve this suspension, the suspension device DS comprises, as is known, support bars distributed radially around said transmission gearbox BT, the upper ends 29 of which bars are articulated to the upper part 30 of the transmission gearbox BT and the lower ends 31 of which bars are articulated to said fuselage F via a bearing 32 or to suspension leaves, not depicted To simplify the drawing, just one support bar has been depicted in FIG. 10.

According to the invention, at least some of the support bars of said suspension device DS are made in the form of two sections 16A and 16B and incorporate an antivibration device 1 according to the invention, as illustrated in any one of FIGS. 1 to 7.

FIG. 10 relates to the embodiment of the antivibration device 1 depicted explicitly in FIG. 7. Of course, the other embodiments according to the invention may also be used for this.

Furthermore, in FIG. 10, the invention is applied to a simplified suspension device DS.

However, it may of course also be applied to a device DS which additionally comprises a suspension system, not depicted, of the known type described, in particular, in patent FR-2 747 098, which connects the lower part of the transmission gearbox to the aircraft fuselage and comprises:

suspension leaves which are distributed radially around said transmission gearbox in a plane roughly orthogonal to the axis of the rotor, the radially inner ends of which are fixed to the lower part of said transmission gearbox and the radially outer ends of which are articulated on the fuselage; and a roughly flat diaphragm fixed under the transmission gearbox, projecting radially beyond said transmission gearbox, fixed by its peripheral part to the aircraft fuselage so that it is roughly orthogonal to the axis of the rotor, deformable in terms of bending under forces exerted orthogonally to its plane, and rigid under forces exerted in its plane.

In another embodiment which is not depicted and which is in accordance with the invention the antivibration device (s) 1 used is (are) not integrated into the support bar as it (they) is (are) in FIG. 10, but is (are) arranged between the support bar and the element to which it (they) must be connected, that is to say:

either between the upper end 29 of the support bar 16 and the upper part 30 of the transmission gearbox BT;

or between the lower end 31 of the support bar 16 and the fuselage F.

Thus, by virtue of the invention:

access to the transmission gearbox BT is freed up, which particularly makes assembly and disassembly easier; and the cost of the suspension device DS is reduced, particularly by dispensing with the costly elastomer articulations which exist in certain known suspension devices.

What is claimed is:

1. An antivibration device intended to reduce the transmission of vibration between two bodies, said device comprising:

an elastic annular element for being connected to said two bodies so as to serve as a connection between them and for being deformed under the action of vibration generated in at least one of said bodies;

a resonator means connected, via at least two leaves which are flexible in terms of bending and rigid in terms of tension and in terms of compression, to the internal face of said annular element so as to be set in oscillating rotation when said annular element is deformed, by the action of said vibration so that, by this oscillating rotation, said resonator means generates an antivibration inertia force which opposes said vibration and thus reduces its transmission from one body to the other.

2. The device as claimed in claim 1, wherein said resonator means (5) comprises a support (9) which is arranged inside said annular element (4) and which is secured, on the one hand, to said leaves (6, 7) and, on the other hand, to at least one support piece (10, 11) bearing at least one mass (12, 13).

3. The device as claimed in claim 2, wherein said mass (12, 13) comprises a number of metal washers (20) borne by said support piece (10, 11).

4. The device as claimed in claim 2, wherein said annular element (4), said leaves (6, 7) and said support (9) are made as a single piece.

5. The device as claimed in claim 1, wherein said resonator means (5) comprises two masses (12, 13) arranged on one same side (24A) of a plane of symmetry (P) of said annular element (4) passing roughly through the center of the zones (2A, 3A) where the latter is attached to said bodies.

6. The device as claimed in claim 1, wherein said resonator means (5) comprises four masses (12A, 12B, 13A, 13B) arranged symmetrically in pairs:

on the one hand, with respect to the center (14) of said annular element (4); and on the other hand, with respect to a plane of symmetry (P) of said annular element (4) passing roughly through the center of the zones (2A, 3A) where the latter is attached to said bodies.

7. A device as claimed in claim 1, which additionally comprises means (25, 26) for preventing said resonator means (5) from moving in a direction that is lateral to said leaves (6, 7).

8. The device as claimed in claim 7, wherein said means (25, 26) for preventing lateral movement are attached to said support (9) and bear against the internal face (8) of said annular element (4).

9. The device as claimed in claim 1, wherein said resonator means (5) comprises two masses (12, 13) arranged symmetrically with respect to the center (14) of said annular element (4).

10. A device as claimed in claim 1, wherein the two bodies and the resonator means are arranged symmetrically with respect to a center point of a circle formed by said elastic annular element in an undeformed state.

11. The device as claimed in claim 1, wherein said two bodies correspond to two sections (16A, 16B) of a bar (16).

12. The device as claimed in claim 11, wherein each of said two sections (16A, 16B) comprises a half ring (4A, 4B) at one of its ends, the two half rings (4A, 4B) being able to be connected together to form said annular element (4).

* * * * *